United States Patent [19]

Tsunokawa et al.

[11] Patent Number: 5,701,752

[45] Date of Patent: Dec. 30, 1997

[54] VEHICULAR AIR TEMPERATURE CONTROL SYSTEM HAVING EXCELLENT WINDSHIELD DEFOGGING CHARACTERISTICS

[75] Inventors: Masaru Tsunokawa, Okazaki; Yukikatsu Ozaki, Nishio; Sadahisa Onimaru, Chiryu; Takahisa Suzuki, Kariya, all of Japan

[73] Assignees: Denso Corporation, Kariya; Nipponsoken, Inc., Nishio, both of Japan

[21] Appl. No.: 736,986

[22] Filed: Oct. 25, 1996

[30] Foreign Application Priority Data

Oct. 26, 1995 [JP] Japan .................................. 7-279128

[51] Int. Cl.$^6$ ............................................ B60S 1/54
[52] U.S. Cl. ..................... 62/183; 165/204; 454/127; 62/244
[58] Field of Search ........................ 62/183, 244, 160, 62/181; 165/43, 204; 454/75, 121, 126, 127; 236/49.3

[56] References Cited

U.S. PATENT DOCUMENTS

| 4,910,967 | 3/1990 | Takahashi | 62/244 X |
| 5,173,078 | 12/1992 | Robin et al. | 454/127 X |
| 5,325,912 | 7/1994 | Hotta et al. | 165/204 |
| 5,605,051 | 2/1997 | Iritani et al. | 62/160 |

FOREIGN PATENT DOCUMENTS

A7108823  4/1995  Japan .

*Primary Examiner*—Harry B. Tanner
*Attorney, Agent, or Firm*—Harness, Dickey & Pierce, PLC

[57] ABSTRACT

When heating the passenger compartment of a vehicle during cold weather, an air switching outlet is operated to allow the entry of outside air with an interior blower being operated to facilitate the entry of the outside air. A condenser door is operated to close an air passage of the condenser and a bypass passage is opened so that outside air flows to the passenger compartment of the vehicle while bypassing the condenser. Further, only a defogging outlet is opened and the incoming air is blown out from this defogging outlet toward the windshield of the vehicle so that a low humidity air curtain is formed proximate to the inner surface of the windshield. After completing the warm-up of the heat pump cycle, the condenser door is switched such that the air blown in by the blower passes the interior condenser to start the heating of the passenger compartment.

12 Claims, 4 Drawing Sheets

VEHICULAR AIR TEMPERATURE CONTROL SYSTEM HAVING EXCELLENT WINDSHIELD DEFOGGING CHARACTERISTICS

CROSS REFERENCE TO RELATED APPLICATION

This application is based on and claims priority from Japanese Patent Application No. 7-279128, the contents of which are incorporated herein by reference.

BACKGROUND OF THE INVENTION

1. Field of the Invention

The present invention relates to the control of heating functions of a vehicular air temperature control system, and more particularly to a vehicular air temperature control system which has improved windshield defogging characteristics, thus making this vehicular air temperature control system suitable for use in low heating capacity electric vehicles and the like.

2. Description of Related Art

Unlike normal fuel-driven vehicles, electric vehicles do not have a heat source, e.g., cooling water (warm water) of an internal combustion engine, for performing heating of a passenger compartment and the like and so, these electric vehicles are usually provided with a heat pump type heater. Warming up of a heat pump cycle of this heat pump type heater involves stopping an internal ventilating fan for a time period (e.g., a few minutes) from the actuation of the heater up to the time discharge pressure of a compressor rises to a level that warm air can be obtained from an internal heat exchanger (condenser).

Meanwhile, when the vehicle is in a cold area and there are a lot of passengers inside the vehicle, humidity in the passenger compartment of the same vehicle rises due to moisture from the respiration or the like of the passengers during a warm-up of the heat pump cycle. Thereafter, air in the passenger compartment is cooled after coming into contact with a windshield of the vehicle. When such air cools down to its dew point, fog is produced across an inner surface of the windshield of the vehicle and thus, forward road visibility is hampered.

Once such fog is produced, it takes a long time to defog and so, a need arises for another heat source such as an electric heater or the like for removing such fog.

SUMMARY OF THE INVENTION

In view of the foregoing problems, it is a primary object of the present invention to provide a vehicular air temperature control system which can prevent fogging in a windshield of a vehicle during warm-up of a heat pump cycle without a need for providing an electric heater, dehumidifier or the like.

To achieve the above-described object, a first aspect of the present invention provides a vehicular air temperature control system for heating a passenger compartment of a vehicle by blowing air from a plurality of air outlets that includes a defogging air outlet directed towards a windshield of the vehicle. This control system includes a case, a heat pump cycle, a physical value detection unit, a blower, a condenser contact switching unit and an air outlet switching unit. The case defines an air passage for guiding air towards the plurality of air outlets. The heat pump cycle includes a condenser which is placed inside the case to heat air in the air passage. The physical value detection unit detects a physical value indicative of surface temperature of the windshield of the vehicle. The blower, which is coupled to the case, blows air towards the air passage of the case. The condenser contact switching unit is disposed inside the case for selectively allowing and preventing contact of the outside air passing through the air passage with the condenser. This condenser contact switching unit prevents contact of the outside air with the condenser when the physical value detected by the physical value detection unit is lower than a predetermined value. The air outlet switching unit is coupled to the case for opening and closing the plurality of air outlets. This air outlet switching unit opens the defogging air outlet when the physical value detected by the physical value detection unit is lower than a predetermined value to direct the outside air towards an inner surface of the windshield to form a low humidity air curtain for preventing fogging in the windshield.

In this way, during the warming up of the heat pump cycle, fogging in the windshield of the vehicle is effectively prevented by introducing outside air and directing such outside air towards the windshield of the vehicle to form an air curtain on the inner surface of such windshield. Thus, there will be no need for a special purpose electric heater or a humidifier for effectively preventing the fogging of the windshield.

Preferably, the physical value detection unit is for directly detecting the surface temperature of the inner surface of the windshield of the vehicle.

Moreover, preferably, the vehicle air temperature control system further includes a dew point calculation unit and an outside air volume control unit. The dew point calculation unit calculates a dew point of air proximate to the inner surface of the windshield of the vehicle. The outside air volume control unit controls an amount of the outside air blown by the blower based on the dew point calculated by the dew point calculation unit and the surface temperature detected by the physical value detection unit to make the dew point lower than the surface temperature and make a difference between the dew point and the surface temperature lower than a predetermined value.

In this way, the amount of outside air being blown towards the windshield can be set to an appropriate amount based on the level of fogging in the windshield of the vehicle.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are hereinafter described with reference to the accompanying drawings.

Figure 1:
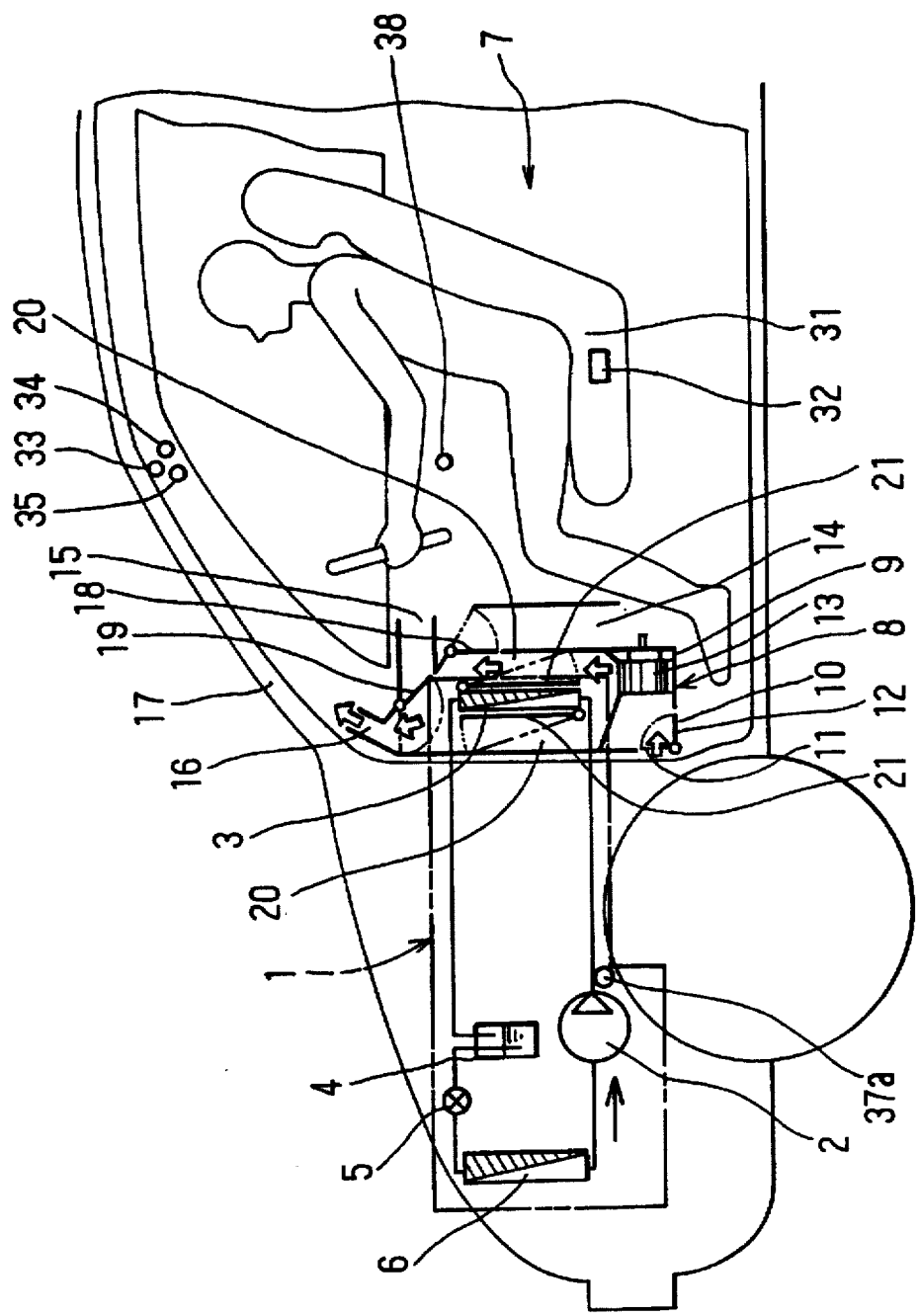
FIG. 1 is a schematic diagram of an air temperature control system according to a first embodiment of the present invention.

FIG. 1 illustrates a vehicular air temperature control system according to a first embodiment of the present invention. A heat pump cycle 1 is for providing heat drawn from air outside of the vehicle to a passenger compartment of the vehicle. The heat pump cycle 1 includes a compressor 2 for compressing and discharging coolant that is within the cycle, an internal heating condenser 3, a receiver 4, a temperature driven expansion valve 5 and an external heat exchanger (evaporator) 6, all of which are connected through pipes.

Because the explanation here focuses on control during vehicle compartment heating as performed by the vehicular air temperature control system, components such as a four-way valve for switching the flow of coolant discharged by the compressor 2 have been omitted from FIG. 1. Actually, as disclosed in Japanese Patent Laid-Open Publication No. Hei 5-319077, the heat pump cycle 1 is to be provided with the evaporator and the four-way valve so that it can be used for performing air temperature control functions, i.e. air conditioning and heating.

Meanwhile, the external heat exchanger 6 is provided outside the passenger compartment of the electric vehicle. To put it more concretely, the external heat exchanger 6 is located at a position where it can easily receive outside air. That is, the external heat exchanger 6 is disposed in front portion of a motor compartment which houses a motor and the like, and which is positioned in front of the passenger compartment 7. Furthermore, the external heat exchanger 6 exchanges heat with outside air that is blown in by an external electric fan (not shown). The compressor 2 is an electrically driven type compressor and has an AC motor which is integrally built in an airtight case. The motor drives the coolant compressor 2 to carry out absorption, compression and discharging of the coolant.

An air conditioning/heating unit 8 is provided underneath an instrument panel in the passenger compartment 7 of the electrical vehicle. A case 9 of the air conditioning/heating unit 8 forms an air passage for leading the temperature controlled air to the passenger compartment 7. An inside air inlet 10 and an outside air inlet 11 for passing the internal air of the vehicle and the outside air into the case 9 are provided at one end of the same case 9. The internal air inlet 10 and the external air inlet 11 are opened and closed by an internal/external air switching door 12.

A blower 13 adjacent to these inlets 10, 11 is provided for blowing air into the case 9. This blower 13 includes a motor and a well-known centrifugal type multiple blade fan which is driven by the motor.

Meanwhile, a plurality of air outlets directed towards the passenger compartment 7 is provided at the other end of the case 9. These outlets are, namely, a lower region air outlet 14 for blowing out temperature controlled air towards the lower region of the passenger compartment 7, i.e., towards the feet or the like of a passenger inside the passenger compartment 7, an upper outlet 15 for blowing out the temperature controlled air toward the upper region of the passenger compartment 7, i.e., towards the upper body part of the passenger, and a defogging outlet 16 for blowing out temperature controlled air towards the inner surface of a windshield 17. Blowing out of the temperature controlled air from the outlets 14, 15 and 16 are controlled and switched by air blow passage switching doors 18 and 19.

The internal condenser 3 is disposed at a middle portion of the air passage in the case 9. In this way, bypass passages 20 are formed near both sides of the condenser 3. Rotatable condenser doors 21 for permitting and blocking air flow to these bypass passages 20 and to the interior condenser 3 are provided proximate to the internal condenser 3. Each of the condenser doors 21 can rotate simultaneously.

Figure 2:
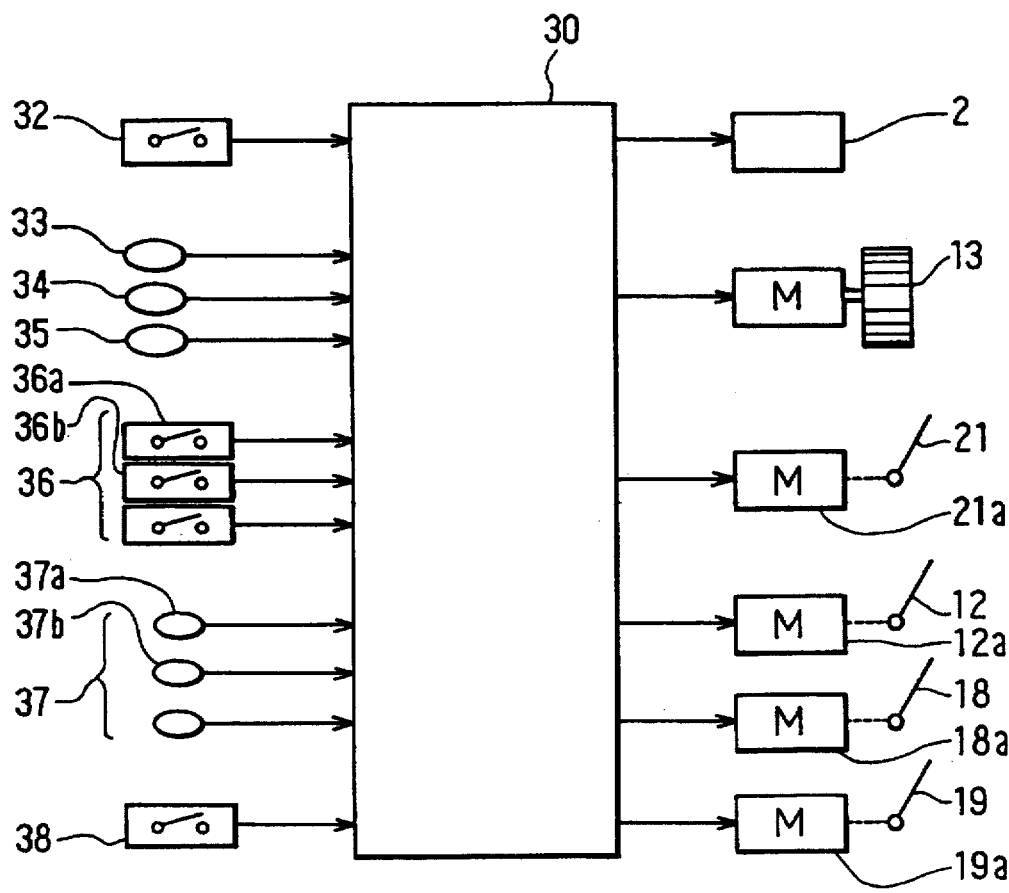
FIG. 2 is a block diagram of an electronic control unit of the air temperature control system according to the first embodiment.

Next, an electronic control unit 30 of the heat pump cycle 1 is explained hereinafter. As shown in FIG. 2, this electronic control unit 30 includes a microprocessor and related circuits and is for controlling the compressor 2 (actuation/deactuation and rotational speed control), the blower 13 (actuation/deactuation and rotational speed control) and the opening and closing of the condenser doors 21. The condenser doors 21 are operated by an actuator 21a which uses a servo motor, an air pressure-controlled diaphragm or the like.

The outside/inside air switching door 12 and air blow passage switching doors 18 and 19 and the like are operated by the electronic control unit 30 using actuators 12a, 18a and 19a, respectively.

A seat switch 32 for detecting if a passenger is riding the vehicle or not is provided in a driver seat 31. A first temperature sensor 33, which includes a thermistor and the like, for detecting the inner surface temperature of the windshield 17 is also provided. A second temperature sensor 34, which includes a thermistor and the like, for detecting an air temperature Ti of air proximate to the inner surface of the windshield 17 is also provided proximate to the inner surface of the windshield 17. In addition, a humidity sensor 35 for detecting humidity H of the air proximate to the inner surface of the windshield 17 is provided adjacent to the second temperature sensor 34.

As will be described later, the second temperature sensor 34 and the humidity sensor 35 are for determining a dew point temperature Tc of the air around the inner surface of the windshield 17. Detection signals of the second temperature sensor 34 and the humidity sensor 35 are provided to the electronic control unit 30 along with the detection signal of the first temperature sensor 33.

As is known in the art, a plurality of switches 36 of an air temperature control panel (not shown), which is near the instrument panel of the vehicle, provide operation signals to the electronic control unit 30. A switch 36a, which belongs to this plurality of switches 36, is a switch for starting and stopping the operation of the compressor 2. A switch 36b is a manual temperature control lever position detection switch that is disposed in the air temperature control panel. This switch 36b is for setting a target temperature for adjusting the temperature of air blown to the passenger compartment by adjusting the rotational speed of the compressor 2 and is also for switching the air conditioning/heating unit 8 to perform heating, cooling or dehumidifying functions. In this way, this switch 36b performs both temperature setting and operation switching functions.

Moreover, the electronic control unit 30 receives sensor signals from a discharge pressure sensor 37a that detects coolant discharge pressure (high cycle pressure) of the compressor 2, an external temperature sensor 37b that detects outside temperature, a plurality of air temperature sensors 37 that include an evaporator temperature sensor and the like for detecting the air temperature immediately after discharge operation of the internal evaporator, and a door switch 38 which operates in accordance with the opening/closing of the doors of the vehicle.

Figure 3:
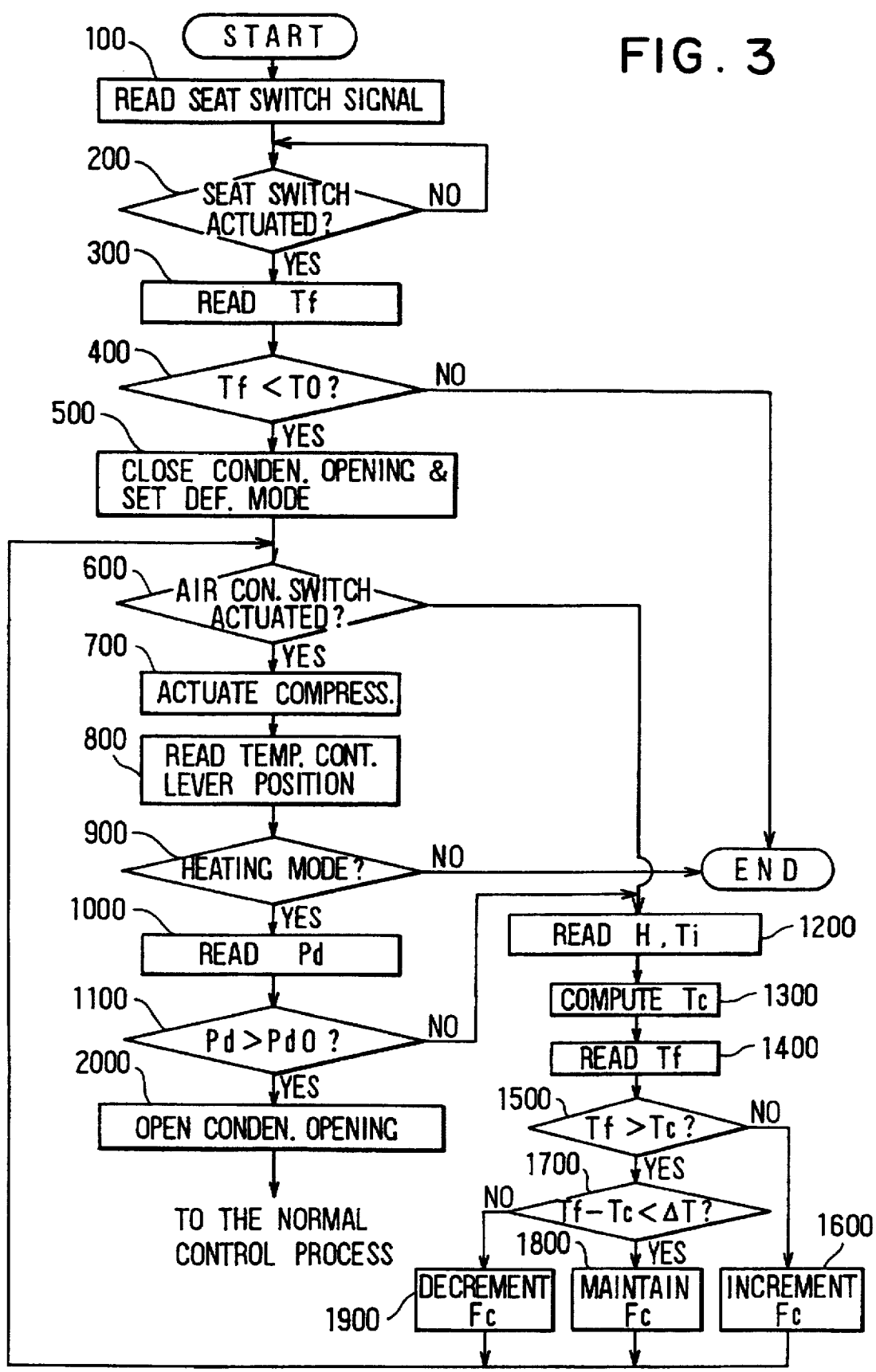
FIG. 3 is a flow chart of a control process executed by the electronic control unit according to the first embodiment.

Next, an operation of the above-described electronic control unit 30 is explained hereinafter. FIG. 3 illustrates a control procedure executed by the electronic control unit 30. When the passenger opens a door of the vehicle to board the vehicle, the door switch 38 is activated and the control procedure shown in FIG. 3 is activated upon receipt of a signal from the door switch 38. In this procedure, step 100 reads the signal from the seat switch 32. When the passenger sits on the seat, step 200 gives a positive output and so control goes to step 300 which reads the surface temperature Tf of the windshield 17.

Step 400 determines whether or not the surface temperature Tf is lower than a predetermined value T0 (for example, 15° C.). That is, when the surface temperature Tf of the windshield 17 is lower than the value T0, air in the passenger compartment 7 may reach the dew point when cooled down by the windshield 17 and so, the possibility of fogging in the windshield 17 becomes high. Therefore, step 400 determines whether or not the surface temperature Tf is conducive to the occurrence of fogging in the windshield 17.

When the surface temperature Tf is lower than the predetermined value T0, control goes to step 500 which sets a defogging mode for introducing outside air. That is, the air switching door 12 is operated to open the outside air inlet 11, the air passage switching doors 18 and 19 are operated to open only the defogging outlet 16, and the blower 13 is actuated to operate at a predetermined speed, for example, at a low speed. At the same time, step 500 operates the condenser doors 21 to be at a closed position, which is shown by the solid lines in FIG. 4, so that the bypass passages 20 are opened.

As a result, outside air introduced through the operation of the blower 13 is blown out from the defogging outlet 16 via the bypass passages 20 of the condenser 3. Therefore, low humidity outside air is blown towards the inner surface of the windshield 17 to form a low humidity air curtain on the surface of the windshield 17. Since the condenser doors 21 prevent heat exchange between the condenser 3 and the outside air, even though the outside air is introduced into the case 9 through the operation of the blower 13, warming up of the heat pump cycle 1 is not hampered.

Next, step 600 determines whether or not the air temperature control switch 36a is actuated and when the switch 36a is actuated, control goes to step 700 which actuates the compressor 2. Step 800 gets the position of the temperature control lever of the air temperature control panel and based on the temperature control lever position, step 900 determines whether the heating mode is set or not. When the heating mode is set, step 1000 gets compressor discharge pressure Pd and step 1100 determines whether or not the warming up during the heating mode of the heat pump cycle 1 has been completed or not based on the compressor discharge pressure Pb. When the compressor discharge pressure Pd becomes larger than a predetermined value Pd0, step 1100 determines that the warming up has been completed.

After the actuation of the compressor 2, since it usually takes a few minutes for the discharge pressure Pd to become larger than the value Pd0, step 1100 gives a negative output for a while after the actuation of the compressor 2. When step 1100 gives a negative output, control goes to step 1200 which reads the air temperature Ti and the humidity H of the air proximate to the inner surface of the windshield 17 and step 1300 determines the dew point temperature Tc based on the air temperature Ti and the humidity H.

Step 1400 reads the surface temperature Tf of the windshield 17. Step 1500 compares the surface temperature Tf with the dew point temperature Tc and when the dew point temperature Tc is higher than the surface temperature Tf, step 1500 gives a negative output. In this case, because humidity H of the air proximate to the inner surface of the windshield 17 is high, the dew point temperature Tc also becomes high and thus, this indicates a shortage in the amount Fc of outside air introduced by the blower 13.

Step 1600 increases the rotational speed of the blower 13 by a predetermined amount to increase the amount Fc of outside air blown in.

When the surface temperature Tf becomes higher than the dew point temperature Tc because of the increase in the amount Fc of outside air introduced, step 1500 gives a positive output. Step 1700 determines whether the difference (Tf−Tc) between the surface temperature Tf and the dew point temperature Tc is smaller than a predetermined value ΔT or not. When the temperature difference (Tf−Tc) is smaller than a predetermined value ΔT (that is, step 1700 gives a positive output), because the amount of outside air Fc is determined to be appropriate, step 1800 maintains the rotational speed of the blower 13 to keep the amount Fc of outside air constant.

When step 1700 determines that the temperature difference (TF−Tc) is larger than the predetermined value ΔT, because there is an excessive amount Fc of outside air, control goes to step 1900 which decreases the rotational speed of the blower 13 by a predetermined amount to decrease the outside air amount Fc.

When the compressor discharge pressure Pd becomes larger than the predetermined value Pd0 after activating the compressor 2, step 1100 gives a positive output after determining that the warming up of the heat pump cycle 1 is complete. Therefore, step 2000 opens the internal condenser doors 21 to the open position shown by the dotted line in FIG. 1 so that air blown in to the case 9 by the blower 13 passes through the internal condenser 3.

At the same time, air blow passage switching doors 18 and 19 are operated to set a lower region blow mode for blowing air mainly from the lower region air outlet 14. Therefore, warm air heated in the interior condenser 3 is blown off from the lower region air outlet 14 towards the feet of the passenger and thus, heating of the passenger compartment starts. Hereinafter, the vehicular air control system is controlled using the normal control heating process.

When step 900 does not determine the heating mode, the vehicular air temperature control system is controlled using the control routines (not shown) for performing air conditioning and/or dehumidifying operations.

Figure 4:
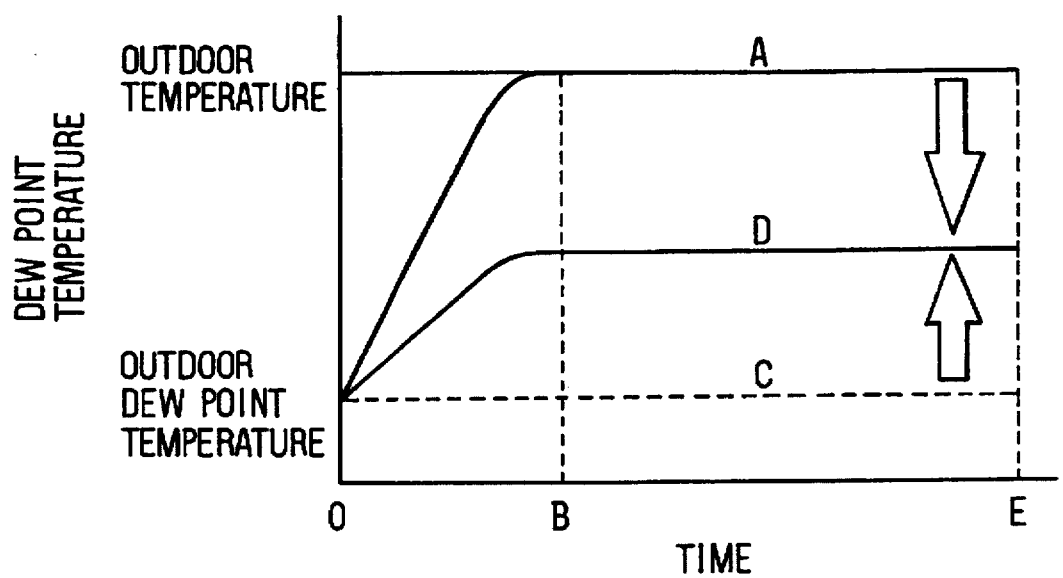
FIG. 4 is a graph showing the effects of the operation of the air temperature control system according to the first embodiment.

FIG. 4 is a graph that illustrates temporal changes in the dew point temperature with the horizontal axis indicating the elapsed time after the passenger entered the passenger compartment 7 and the vertical axis indicating the dew point temperature of the air proximate to the inner surface of the windshield 17. FIG. 4 illustrates the effects of the first embodiment and line A indicates the dew point temperature of the air inside the passenger compartment 7. When the air curtain of low humidity outside air is not formed on the inner surface of the windshield 17, because the humidity in the passenger compartment 7 rises due to moisture from the respiration of the passenger after the passenger enters the passenger compartment 7 at time 0, the dew point temperature of the air in the passenger compartment 7 rises up to the level of the outside temperature at time B in a short period of time.

In the normal heat pump cycle of the electric vehicle, since the blower 13 is stopped during warm-up, the air near the inner surface of the windshield 17 is cooled down to the outside temperature (that is, temperature indicated by line A) in FIG. 4 by the windshield 17 at time B and when it reaches the dew point temperature (at which relative humidity is 100%), fog appears across the inner surface of the windshield 17 and the visibility of the windshield 17 is nearly zero at time E when the warming up of the heat pump cycle 1 is finished.

In comparison, in the first embodiment, similar to the case during normal heat pump cycle, the dew point temperature of the air inside the passenger compartment 7 is also indicated by line A because of the moisture due to the respiration of the passenger. However, the inner surface of the windshield 17 has a dew point temperature indicated by line D in FIG. 4 which is between the dew point temperature A of the air inside the passenger compartment and the dew point temperature C of the outside temperature.

Because the dew point temperature D of the air around the inner surface of the windshield 17 is lower than the outside temperature, there will be no fogging in the windshield 17. The above-described relationship holds true even after time elapses further more and thus, there will be no fogging in the windshield 17 until the time E when the warm-up is completed and thus, good road visibility can always be obtained.

Figure 5:
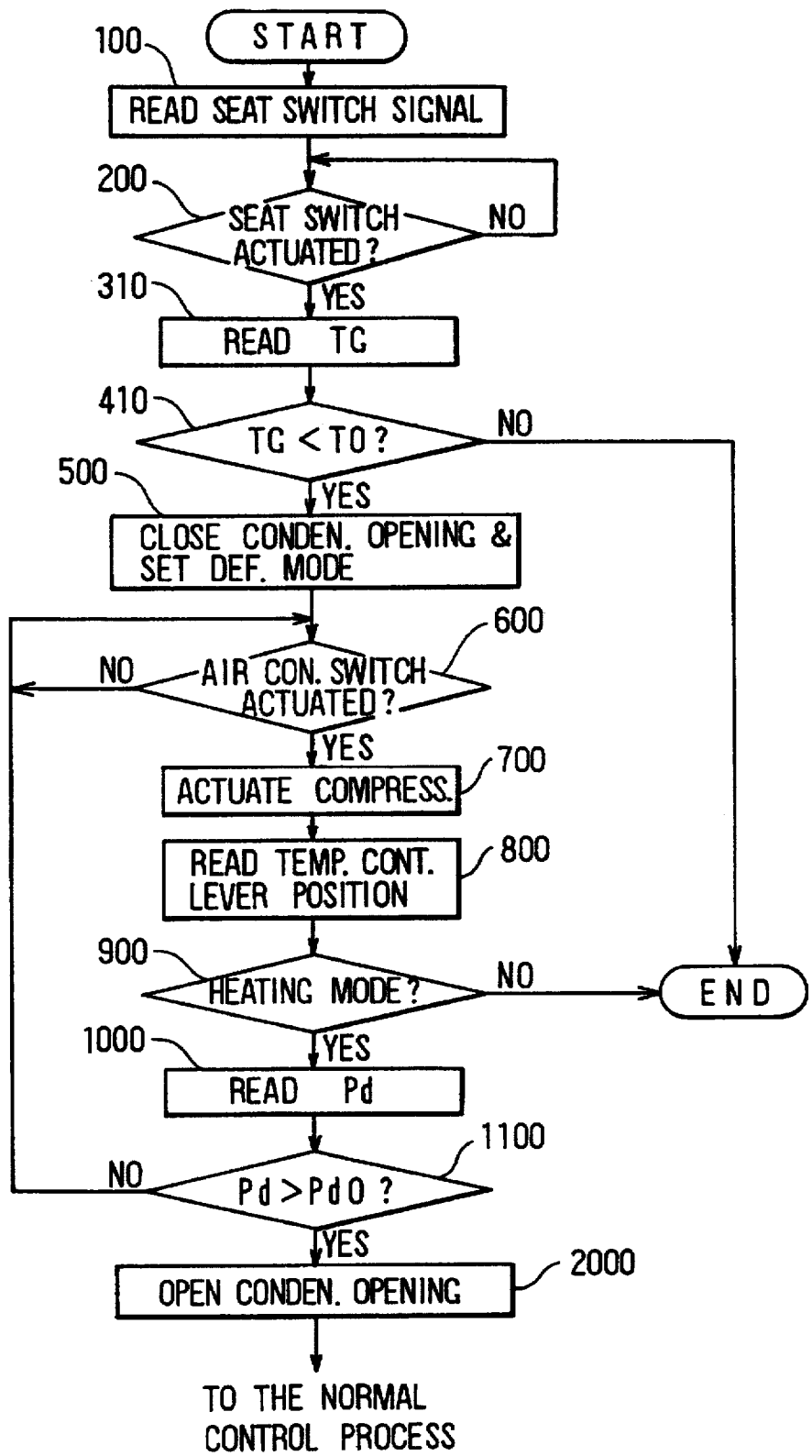
FIG. 5 is a flow chart of a control process executed by the electronic control unit according to a second embodiment of the present invention.

A second embodiment of the present invention is explained hereinafter. FIG. 5 illustrates a control procedure according to the second embodiment. Some of the steps in FIG. 5 are substantially the same as those in FIG. 3 and thus, these steps have been marked using the same numbers used in FIG. 3. In the same way as that of the first embodiment, this second embodiment also prevents the fogging in the windshield by forming the air curtain near the inner surface of the windshield 17 by introducing low humidity outside air during the warm-up of the heat pump cycle 1.

One difference between the first embodiment and this second embodiment is that the present embodiment does away with the temperature sensor 33 for detecting the temperature of the interior surface of the windshield 17, the temperature sensor 34 for detecting the temperature of the air proximate to the inner surface of the windshield 17 and the humidity sensor 35 for detecting the humidity of the air proximate to the inner surface of the windshield 17 and the automatic control of the outside air amount Fc in accordance with the dew point temperature of the air proximate to the inner surface of the windshield 17. That is, in the second embodiment, the amount of outside air Fc is fixed to a predetermined amount.

Also, because the present embodiment does away with the temperature sensor 33 for detecting the inner surface temperature of the windshield 17, step 310 reads a signal of the outside temperature sensor 37 for detecting the outside temperature TG which is correlated to the inner surface temperature of the windshield 17. When subsequent step 410 determines that the outside temperature TG is lower than the predetermined temperature T0, control goes to step 500 which sets the defogging mode for introducing the low humidity outside air. Other characteristics of the present embodiment are the same as that of the first embodiment.

Although the present invention has been fully described in connection with preferred embodiments thereof with reference to the accompanying drawings, it is to be noted that various changes and modifications will become apparent to those skilled in the art.

In the first embodiment, although the completion of the warm-up of the heat pump cycle 1 is determined based on the coolant discharge pressure Pd of the compressor 2, the completion of the warm-up can also be determined based on the coolant temperature discharged by the compressor 2. In other words, completion of the warm-up of the heat pump cycle 1 may be determined by detecting a physical amount which is indicative of the temperature of the interior condenser 3.

Furthermore, in the first embodiment, the temperature Ti of air proximate to the inner surface of the windshield 17 and the air humidity H near the inner surface of the windshield 17 are detected using sensors 34 and 35 and the dew point temperature Tc is determined by the electronic control unit 30 based on the air temperature Ti and air humidity H. Aside from the above-described construction, a dew point calculating unit, which includes the temperature sensor 34 for detecting the air temperature Ti, the humidity sensor 35 for detecting the air humidity H and the dew point calculating circuit that calculates the dew point temperature Tc based on the air temperature Ti and the air humidity H, may be disposed proximate to the inner surface of the windshield 17 so that the output of this dew point calculating unit can be provided to the electronic control unit 30.

In addition, it goes without saying that a two-stage compression cycle for compressing the coolant in two stages, a two-stage expansion cycle for expanding the coolant in two stages, an injection cycle for injecting the coolant having intermediate pressure during compression and the like may also be used as the heat pump cycle 1.

Such changes and modifications are to be understood as being within the scope of the present invention as defined by the appended claims.

What is claimed is:

1. A vehicular air temperature control system for heating a passenger compartment of a vehicle by blowing air from a plurality of air outlets that includes a defogging air outlet for blowing air towards a windshield of said vehicle, said control system comprising:

a case which defines an air passage for guiding air towards said plurality of air outlets;

a heat pump cycle which includes a condenser, said condenser being disposed in said case for heating said air in said air passage;

physical value detection means for detecting a physical value indicative of surface temperature of said windshield of said vehicle;

a blower, which is coupled to said case, for blowing air towards said air passage of said case;

condenser contact switching means, which is disposed in said case, for selectively allowing and preventing contact of said outside air passing through said air passage with said condenser, said condenser contact switching means being for preventing said contact of said outside air with said condenser when said physical value detected by said physical value detection means is lower than a predetermined value; and air outlet switching means coupled to said case for opening and closing said plurality of air outlets, said air outlet switching means being for opening said defogging air outlet when said physical value detected by said physical value detection means is lower than a predetermined value to direct said outside air towards an inner surface of said windshield to form a low humidity air curtain for preventing fogging in said windshield.

2. A vehicular air temperature control system according to claim 1, wherein said air outlet switching means is for opening only said defogging air outlet and for closing the rest of said air outlets when said physical value detected by said physical value detection means is lower than a predetermined value.

3. A vehicular air temperature control system according to claim 1, said control system further comprising:

cycle warming-up completion detecting means coupled to said heat pump cycle for detecting a completion of a warming up process of said heat pump cycle;

wherein said condenser contact switching means allows said contact of said outside air with said condenser after said cycle warming-up completion detecting means detects said completion of said warming up process of said heat pump cycle.

4. A vehicular air temperature control system according to claim 3, wherein said cycle warming-up completion detecting means determines that said warming up process of said heat pump cycle is complete when a temperature of said condenser becomes no lower than a predetermined temperature.

5. A vehicular air temperature control system according to claim 1, wherein said physical value detection means is for directly detecting said surface temperature of said inner surface of said windshield of said vehicle.

6. A vehicular air temperature control system according to claim 5, said control system further comprising:

dew point calculation means for calculating a dew point of air proximate to said inner surface of said windshield of said vehicle; and outside air volume control means for controlling an amount of said outside air blown by said blower based on said dew point calculated by said dew point calculation means and said surface temperature detected by said physical value detection means to make said dew point lower than said surface temperature and make a difference between said dew point and said surface temperature lower than a predetermined value.

7. A vehicular air temperature control system for heating a passenger compartment of a vehicle by blowing air from a plurality of air outlets in said passenger compartment that includes a defogging air outlet that is directed towards a windshield of said vehicle, a lower region air outlet that is directed towards a lower region of said passenger compartment and an upper region air outlet that is directed towards an upper region of said passenger compartment, said control system:

a heat pump cycle which includes a condenser;

a case which is for accommodating said condenser which defines a first passage and a second passage parallel to said first passage, said first passage being for guiding air towards said plurality of air outlets while passing through said condenser so that air is heated by said condenser, said second passage being for guiding air towards said plurality of air outlets while bypassing said condenser;

physical value detection means for detecting a physical value indicative of a surface temperature of said windshield of said vehicle;

a blower, which is coupled to said case, for blowing air towards said case;

air type switching means for selecting said air to be blown by said blower to said housing condenser to be one of outside air that is outside of said vehicle, and inside air, that is inside said vehicle, said air type switching means being for selecting outside air when said physical value detected by said physical value detection means is lower than said predetermined value;

condenser door switching means disposed inside said case for selectively opening and closing said first passage and said second passage, said condenser door switching means being for closing said first passage and for opening said second passage when said physical value detected by said physical value detection means is lower than said predetermined value so that said outside air bypasses said condenser; and air outlet switching means for selectively opening and closing said defogging air outlet, said lower region air outlet and said upper region air outlet, said air outlet switching means being for opening said defogging air outlet to direct said outside air towards an inner surface of said windshield when said physical value detected by said physical value detection means is lower than a predetermined value to form a low humidity air curtain for preventing fogging in said windshield.

8. A vehicular air temperature control system according to claim 7, wherein said air outlet switching means is for opening only said defogging air outlet and for closing the rest of said air outlets when said physical value detected by said physical value detection means is lower than a predetermined value.

9. A vehicular air temperature control system according to claim 7, said system further comprising:

cycle warming-up completion detecting means coupled to said heat pump cycle for detecting a completion of a warming up process of said heat pump cycle;

wherein said condenser door switching means opens said first passage and closes said second passage so that said outside air makes contact with said condenser after said cycle warming-up completion detecting means detects said completion of said warming up process of said heat pump cycle.

10. A vehicular air temperature control system according to claim 9, wherein said cycle warming-up completion detecting means determines that said warming up process of said heat pump cycle is complete when a temperature of said condenser becomes no lower than a predetermined temperature.

11. A vehicular air temperature control system according to claim 7, wherein said physical value detection means is for directly detecting an inner surface temperature of an inner surface of said windshield of said vehicle.

12. A vehicular air temperature control system according to claim 11, said system further comprising:

dew point calculation means for calculating a dew point of air proximate to said inner surface of said windshield of said vehicle; and outside air volume control means for controlling an amount of said outside air blown by said blower based on said dew point calculated by said dew point calculation means and said surface temperature detected by said physical value detection means to make said dew point lower than said surface temperature and make a difference between said dew point and said surface temperature lower than a predetermined value.

* * * * *